(12) United States Patent
Nakao et al.

(10) Patent No.: US 8,180,413 B2
(45) Date of Patent: May 15, 2012

(54) HINGE STRUCTURE AND FOLDING MOBILE TERMINAL USING THE SAME

(75) Inventors: Junichi Nakao, Tokyo (JP); Yasuyuki Honma, Shizuoka (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 12/439,923

(22) PCT Filed: Aug. 14, 2007

(86) PCT No.: PCT/JP2007/065860
§ 371 (c)(1),
(2), (4) Date: Mar. 11, 2009

(87) PCT Pub. No.: WO2008/029596
PCT Pub. Date: Mar. 13, 2008

(65) Prior Publication Data
US 2009/0291720 A1   Nov. 26, 2009

(30) Foreign Application Priority Data

Sep. 8, 2006   (JP) .................................. 2006-243770

(51) Int. Cl.
*H04M 1/00*   (2006.01)
(52) U.S. Cl. ................. 455/575.3; 455/575.1; 455/90.3; D14/140
(58) Field of Classification Search ............... 455/575.1, 455/575.3, 90.3; D14/140, 138 AB
See application file for complete search history.

(56) References Cited

U.S. PATENT DOCUMENTS

| | | | |
|---|---|---|---|
| 6,317,927 B1 * | 11/2001 | Lai et al. | 16/342 |
| 6,320,961 B1 * | 11/2001 | Hayasaka | 379/433.13 |
| 6,459,887 B2 * | 10/2002 | Okuda | 455/90.1 |
| 7,150,072 B2 * | 12/2006 | Huang et al. | 16/312 |
| 7,215,981 B2 * | 5/2007 | Yang | 455/575.3 |
| 7,437,185 B2 * | 10/2008 | Yang et al. | 455/575.3 |
| 7,853,009 B2 * | 12/2010 | Moskowitz et al. | 379/433.12 |
| 2004/0147296 A1 * | 7/2004 | Lin | 455/575.3 |
| 2006/0160583 A1 * | 7/2006 | Ryu | 455/575.3 |

FOREIGN PATENT DOCUMENTS

| | | |
|---|---|---|
| JP | 2005344763 A | 12/2005 |
| JP | 2006174275 A | 6/2006 |

OTHER PUBLICATIONS

International Search Report for PCT/JP2007/065860 mailed Sep. 18, 2007.

* cited by examiner

*Primary Examiner* — Olumide T Ajibade Akonai

(57) ABSTRACT

An upper case of the display section includes a first connecting portion having a cylindrical hole, into which an inner cylinder of a dummy hinge composed of two cylindrical portions having the same axis and different diameters is inserted rotatably, wherein the first connecting portion protrudes from an end of the upper case. An upper case of the keybutton section includes a second connecting portion located, along a hinge axis, on the center side of the first connecting portion, and having a cylindrical hole into which an outer cylindrical portion of the dummy hinge is inserted unrotatably, wherein the second connecting portion protrudes from an end of the upper case. The hinge structure comprises a stopper for fixing the dummy hinge, which can be inserted as the dummy hinge is buried in the cylindrical hole, with the inner cylindrical portion inserted into the cylindrical hole of the first connecting portion.

10 Claims, 4 Drawing Sheets

HINGE STRUCTURE AND FOLDING MOBILE TERMINAL USING THE SAME

TECHNICAL FIELD

The present invention relates to a hinge structure for use in folding mobile terminals, particularly, a hinge structure for folding mobile terminals with excellent assemblability.

BACKGROUND ART

Conventionally, a hinge structure for use in folding mobile terminals has a dummy hinge 5 that is located as it protrudes from one of the cases of a mobile terminal device, and fixed to such location. Thus, the mobile terminal device is assembled while the other case is deformed when the other case, in which the dummy hinge 5 is unfixed, is built in the device. Therefore, this results in poor assemblability, sometimes breakage of the case, thereby making it unusable, and a factor for reduced productivity.

A related art associated with a hinge structure for use in folding mobile terminals includes "portable terminal device and hinge module incorporating fixing structure of portable terminal device", which is disclosed in Patent Document 1.

The patent disclosed in the Patent Document 1 is one in which two cases are rotatably connected by inserting a hinge module from a connecting portion located at the center side of its hinge axis toward a connecting portion located at the end side of the hinge axis.

Patent Document 1: Japanese Patent Laid Open Publication No. 2005-344763

DISCLOSURE OF THE INVENTION

Problems to be Solved by the Invention

Though the patent disclosed in the Patent Document 1 requires that the hinge module is inserted from the center side of the hinge axis toward the end side of the hinge axis, it is not easy to perform this work for mobile terminals that become increasingly downsized. In other words, application of the patent disclosed in the Patent Document 1 results in reduced assemblability.

The present invention has been made in view of the above problems, and an exemplary object of the present invention is to provide a hinge structure for folding mobile terminals for preventing breakage of cases thereof during its assembling without loss of assemblability, and a folding mobile terminal using the same.

Means for Solving the Problems

In order to achieve the above exemplary object, the present invention, as a first exemplary aspect, provides a hinge structure for foldably connecting a first housing with a second housing, wherein a front case of the first housing is provided with a first connecting portion having a first cylindrical hole, into which an inner cylindrical portion of a dummy hinge is inserted rotatably, wherein the first connecting portion protrudes from an end of the front case of the first housing; a front case of the second housing is provided with a second connecting portion that is located, along a hinge axis, on the center side of the first connecting portion when connected, and that has a second cylindrical hole into which an outer cylindrical portion of the dummy hinge is inserted unrotatably, wherein the second connecting portion protrudes from an end of the front case of the second housing; and the hinge structure comprises a stopper for fixing the dummy hinge, which can be inserted as the dummy hinge is buried in the second cylindrical hole, with the inner cylindrical portion of the dummy hinge inserted into the first cylindrical hole.

Preferably, in the first exemplary aspect of the present invention, a rear case of the first housing or the second housing serves as the stopper.

In order to achieve the above exemplary object, the present invention, as a second exemplary aspect, provides a hinge structure for foldably connecting a first housing with a second housing, wherein a rear case of the first housing is provided with a first connecting portion having a first cylindrical hole, into which an inner cylindrical portion of a dummy hinge is inserted rotatably, wherein the first connecting portion protrudes from an end of the rear case of the first housing; a rear case of the second housing is provided with a second connecting portion that is located, along a hinge axis, on the center side of the first connecting portion when connected, and that has a second cylindrical hole into which an outer cylindrical portion of the dummy hinge is inserted unrotatably, wherein the second connecting portion protrudes from an end of the rear case of the second housing; and the hinge structure includes a stopper for fixing the dummy hinge, which can be inserted as the dummy hinge is buried in the second cylindrical hole, with the inner cylindrical portion of the dummy hinge inserted into the first cylindrical hole.

Preferably, in the second exemplary aspect of the present invention, a front case of the first housing or the second housing serves as the stopper.

In either the above mentioned configuration of the first or the second exemplary aspect of the present invention, preferably, the dummy hinge is inserted into the second cylindrical hole from a side adjacent to the first connecting portion; the dummy hinge is moved back from the second cylindrical hole with the first connecting portion and the second connecting portion adjacent to each other; and the inner cylindrical portion of the dummy hinge is inserted into the first cylindrical hole. Moreover, preferably, a flexible substrate for electrically connecting a circuit board housed in the first housing with a circuit board housed in the second housing is arranged in the dummy hinge.

Moreover, in order to achieve the above-mentioned exemplary object, the present invention, as a third exemplary aspect, provides a folding mobile terminal in which the hinge structure according to the configuration of either the first or the second exemplary aspect of the present invention is employed.

Advantage Of The Invention

According to the present invention, a hinge structure for folding mobile terminals for preventing breakage of cases thereof during its assembling without loss of assemblability, and a folding mobile terminal using the same can be provided.

BEST MODE FOR CARRYING OUT THE INVENTION

An exemplary embodiment of the present invention is described.

FIG. 1 shows a configuration of a mobile terminal device according to the exemplary embodiment. The mobile terminal device 10 is a common folding mobile phone terminal.

The mobile terminal device 10 comprises a hinge portion 3 for electrically connecting a display section 11 with a key-button section 12.

The hinge portion 3 is a member for structurally fixing an upper case 1 including the keybutton section 12 and an upper case 2 including the display section 11. The hinge portion 3 is necessary for opening/closing movements.

FIG. 2 shows a structure inside of the hinge portion 3 as viewed from a rear face thereof.

The upper case 1 including the keybutton section 12 and the upper case 2 including the display section 11 comprises a flexible substrate 4 required for the electric connection therebetween to achieve character input to the display section 11. However, the display section 11 and the keybutton section 12 may be connected by any other way (e.g. by using a plurality of lead wires as in a two-axis hinge) other than the flexible substrate 4.

As described below, the upper case 1 is provided with a cylindrical hole 9 for passing a dummy hinge 5 therethrough. The dummy hinge 5 for protecting the flexible substrate 4 during its rotation and implementing the flexible substrate 4 is provided to fix the upper case 1 and the upper case 2. The dummy hinge 5 is provided with a cylindrical portion 8 so that a lower case can be rotated.

A hinge unit 6 is set in on the opposite side of the dummy hinge 5 for keeping opening/closing positions and fixing the upper case and the lower case. The hinge unit 6 may be one that produces sound (clicking sound) when the folding mobile terminal is in a partially opened position or in the fully opened position.

The hinge portion 3 further includes a frame 7 for retaining the dummy hinge 5 such that the dummy hinge 5 dose not detach axially after attaching.

An assembly process of the mobile terminal device according to the exemplary embodiment is described with reference to FIG. 3.

First, the dummy hinge 5 is axially inserted into the cylindrical hole 9 of the upper case 1. In the axial direction of the cylindrical hole 9, since there is no wall for holding the dummy hinge 5 in the insertion direction, the dummy hinge 5 may also be placed at a deeper position in the axial direction than a predetermined position. In this case, the cylindrical portion 8 of the dummy hinge 5 is preferably inserted until the cylindrical portion 8 is completely hidden inside the upper case 1. This is because, when the cylindrical portion 8 is in the position shown in FIG. 4, the upper case 2 can be easily built in.

After assembling the upper case 2, moving the dummy hinge 5 back (by means of a finger, a jig, and the like) in the axial direction opposite to the insertion direction (i.e. in a direction A shown in FIG. 5) results in a state shown in FIG. 1 (a state with the cylindrical portion of the dummy hinge 5 inserted into a hole of a hinge portion of the upper case 2). The upper case 1 and the upper case 2 can be retained in this state.

The dummy hinge 5, if it remains in this state, may drop off. Therefore, the frame 7 is provided to prevent the dummy hinge 5 from dropping off in the insertion direction. Such fixing means may be formed with a lower case 12, and any other member may be employed as long as the dummy hinge 5 can be fixed.

A configuration of the hinge portion 3 that is eventually built in is shown in FIG. 6. The cylindrical portion 8 of the dummy hinge 5 is inserted into the upper case 2, so that the upper case 1 and the upper case 2 are rotatable via the dummy hinge 5. Placing the stopper 7 prevents the dummy hinge 5 from dropping out to the upper case 1 side, so that the upper case 1 and the upper case 2 may not be disconnected from one another.

In this way, when the case including the display section and the case including the keybutton section are connected with the hinge portion, the mobile terminal device according to the exemplary embodiment can be assembled without deforming one of the cases. Furthermore, since the dummy hinge is mounted by moving from the end side toward the center side of the hinge axis, there is no loss of assemblability.

Accordingly, the present invention not only makes assembly thereof easy, thereby improving productivity thereof, but also allows preventing breakage of the cases thereof or the like.

Note that the above-mentioned exemplary embodiment is an example of a preferred exemplary embodiment of the present invention, and the present invention is not limited to this.

For example, in the above-mentioned exemplary embodiment, the configuration as the dummy hinge is attached on the upper case side that is a front of the terminal has been described as an example, but the dummy hinge may also be attached on the lower case side.

The present invention may be applied to not only mobile phone terminals but also all mobile terminals.

In this way, the present invention may be variously modified.

This application is the National Phase of PCT/JP2007/065860, filed Aug. 14, 2007, which is based upon and claims the benefit of priority from Japanese patent application No. 2006-243770, filed on Sep. 8, 2006, the disclosure of which is incorporated herein in its entirety by reference.

Figure 1:
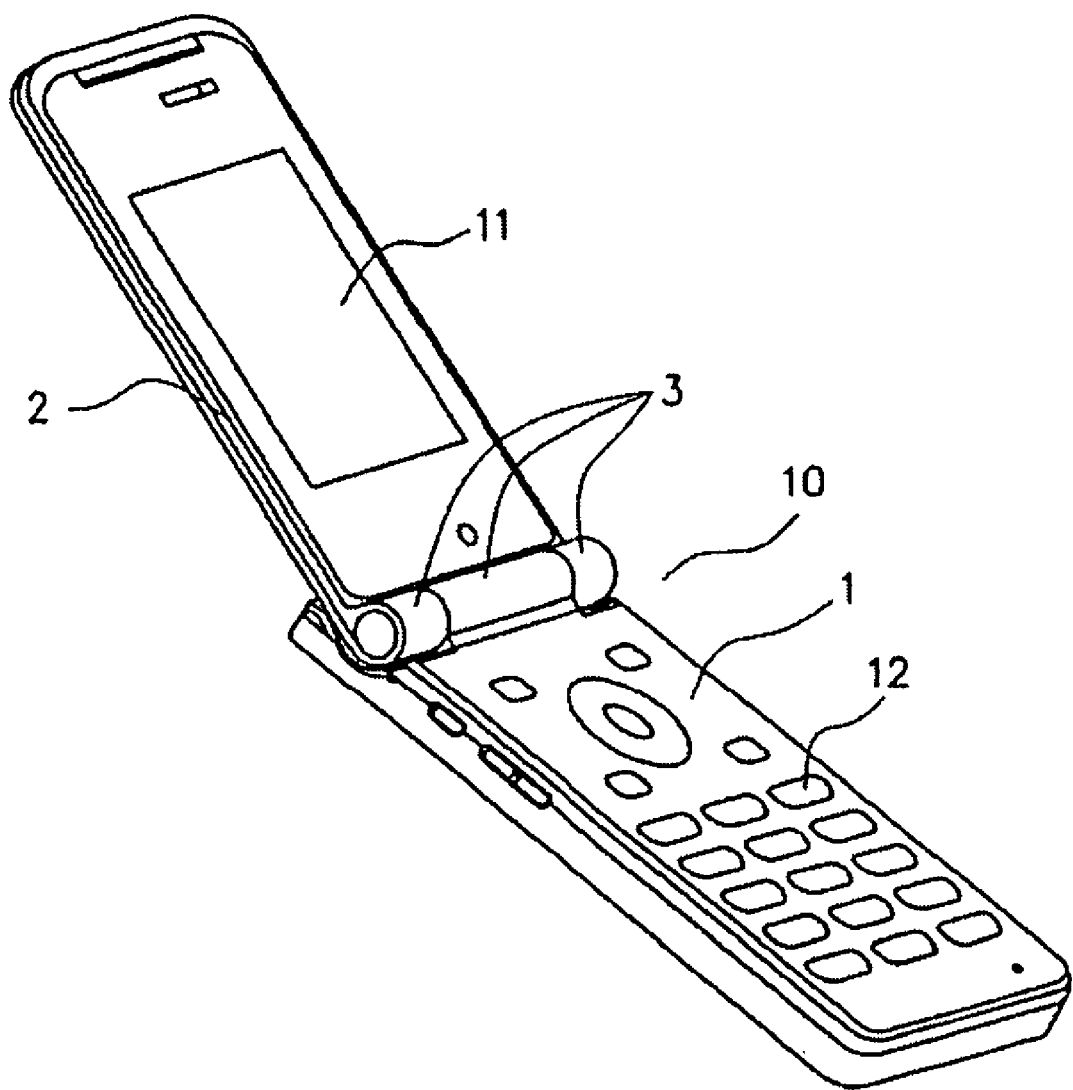
FIG. 1 is a view showing a configuration of a mobile terminal device suitably embodying the present invention.
Figure 2:
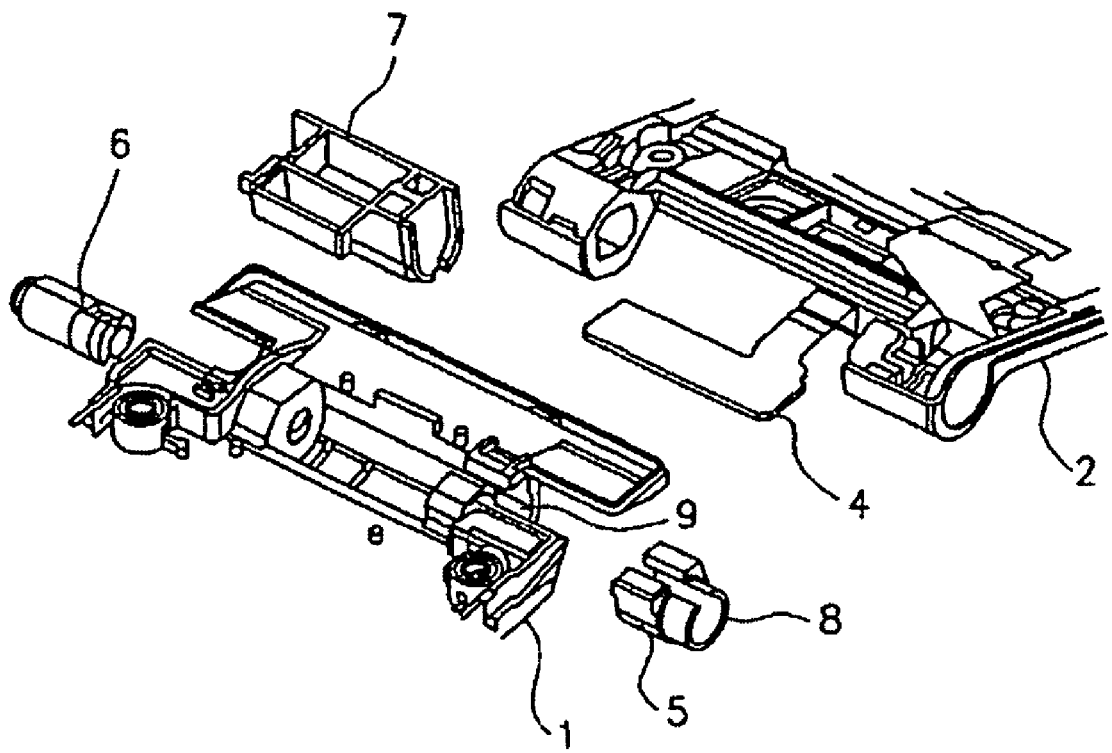
FIG. 2 is a view showing a configuration of a hinge portion.
Figure 3:
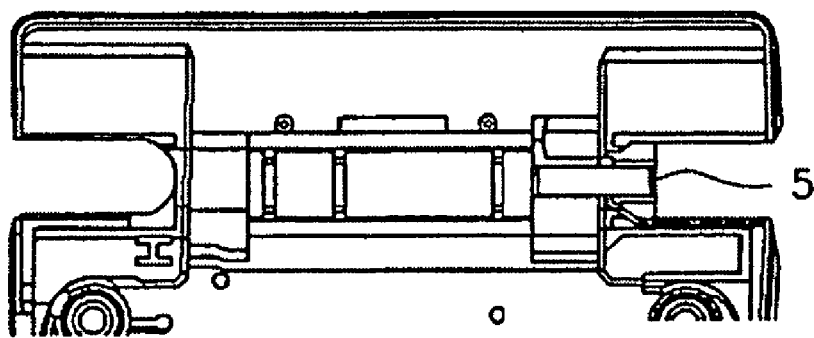
FIG. 3 is a view showing a state with a dummy hinge mounted on an upper case.
Figure 4:
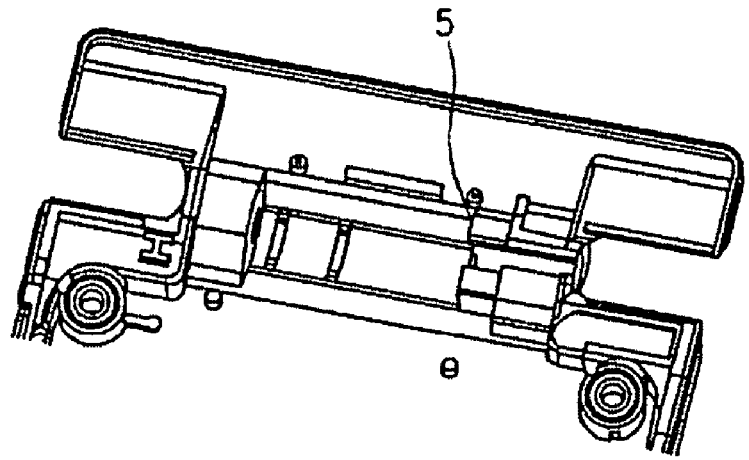
FIG. 4 is a view showing a state with the dummy hinge mounted on the upper case in an axially pushed position.
Figure 5:
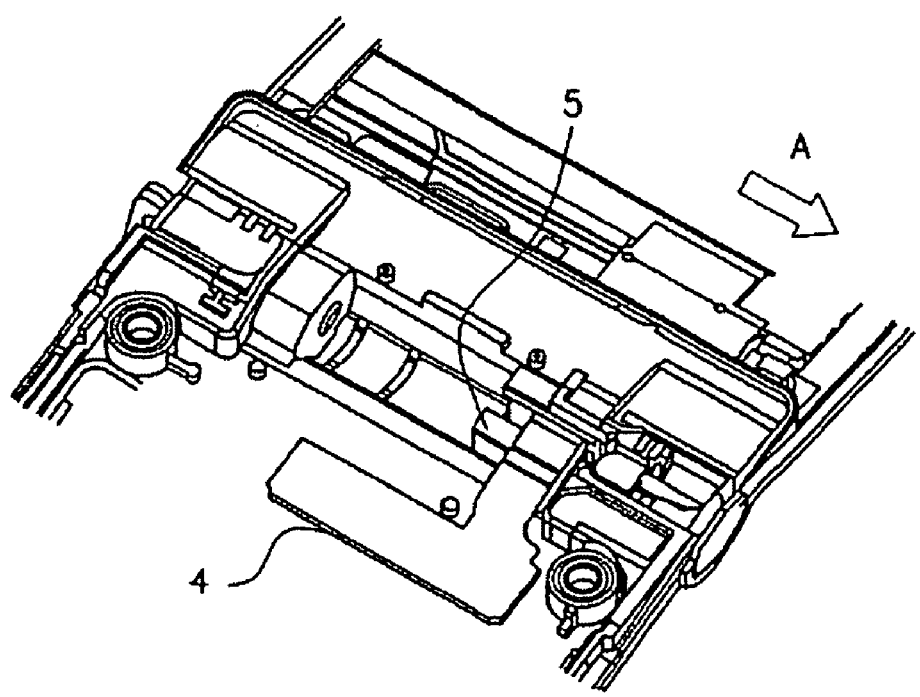
FIG. 5 is a view showing a state with the dummy hinge and a flexible substrate located on the upper case.
Figure 6:
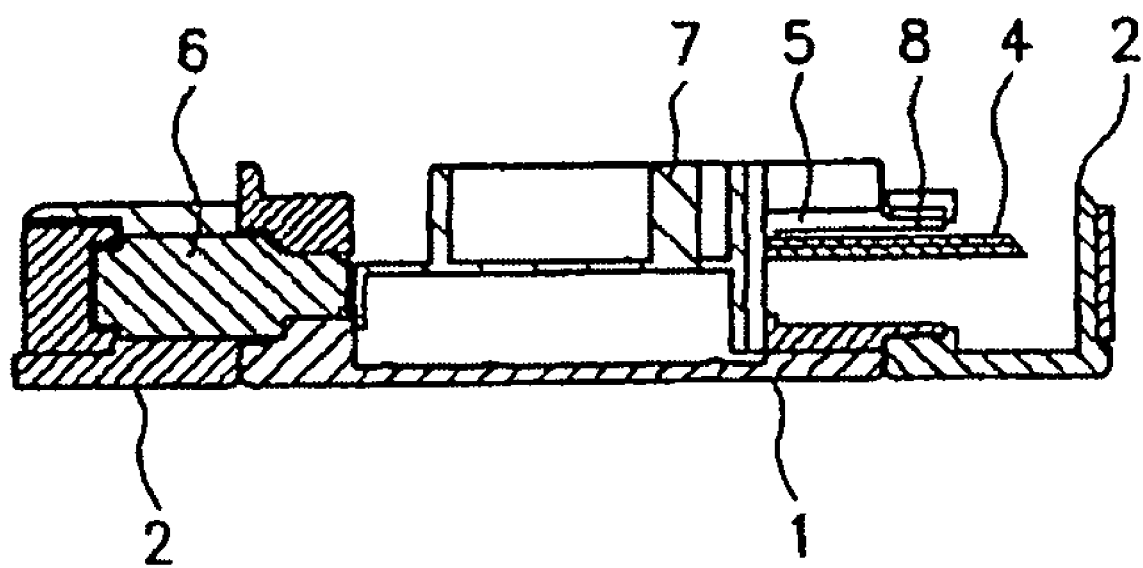
FIG. 6 is a view showing a cross section of the hinge portion that has been assembled.

DESCRIPTION OF SYMBOLS 1 upper case (keybutton section side)
2 upper case (display section side)
3 hinge portion
4 flexible substrate
5 dummy hinge
6 hinge unit
7 frame
8 cylindrical portion
9 cylindrical hole
10 mobile terminal device
11 display section
12 keybutton section

The invention claimed is:

1. A hinge structure for foldably connecting a first housing with a second housing, wherein:
   a front case of the first housing is provided with a first connecting portion having a first cylindrical hole, into which an inner cylindrical portion of a dummy hinge composed of two cylindrical portions that have the same axis and different diameters, respectively, is inserted rotatably, wherein the first connecting portion protrudes from an end of the front case of the first housing;

a front case of the second housing is provided with a second connecting portion that is located, along a hinge axis, on the center side of the first connecting portion when connected, and that has a second cylindrical hole into which an outer cylindrical portion of the dummy hinge is inserted unrotatably, wherein:

the second connecting portion protrudes from an end of the front case of the second housing, and the second cylindrical hole has a diameter that allows the outer cylindrical portion of the dummy hinge to penetrate through the second cylindrical hole; and the hinge structure comprises a stopper for fixing the dummy hinge, which can be inserted as the dummy hinge is buried in the second cylindrical hole, with the inner cylindrical portion of the dummy hinge inserted into the first cylindrical hole.

2. The hinge structure according to claim 1, characterized in that a rear case of the first housing or the second housing serves as the stopper.

3. A hinge structure for foldably connecting a first housing with a second housing, wherein:

a rear case of the first housing is provided with a first connecting portion having a first cylindrical hole, into which an inner cylindrical portion of a dummy hinge composed of two cylindrical portions that have the same axis and different diameters, respectively, is inserted rotatably, wherein the first connecting portion protrudes from an end of the rear case of the first housing;

a rear case of the second housing is provided with a second connecting portion that is located, along a hinge axis, on the center side of the first connecting portion when connected, and that has a second cylindrical hole into which an outer cylindrical portion of the dummy hinge is inserted unrotatably, wherein:

the second connecting portion protrudes from an end of the rear case of the second housing, and the second cylindrical hole has a diameter that allows the outer cylindrical portion of the dummy hinge to penetrate through the second cylindrical hole; and the hinge structure comprises a stopper for fixing the dummy hinge, which can be inserted as the dummy hinge is buried in the second cylindrical hole, with the inner cylindrical portion of the dummy hinge inserted into the first cylindrical hole.

4. The hinge structure according to claim 3, wherein a front case of the first housing or the second housing serves as the stopper.

5. The hinge structure according to claim 1, wherein the dummy hinge is inserted into the second cylindrical hole from a side adjacent to the first connecting portion;

the dummy hinge is moved back from the second cylindrical hole with the first connecting portion and the second connecting portion adjacent to each other; and the inner cylindrical portion of the dummy hinge is inserted into the first cylindrical hole.

6. The hinge structure according to claim 1, wherein a flexible substrate for electrically connecting a circuit board housed in the first housing with a circuit board housed in the second housing is arranged in the dummy hinge.

7. A folding mobile terminal in which the hinge structure according to claim 1 is employed.

8. The hinge structure according to claim 3, wherein the dummy hinge is inserted into the second cylindrical hole from a side adjacent to the first connecting portion;

the dummy hinge is moved back from the second cylindrical hole with the first connecting portion and the second connecting portion adjacent to each other; and the inner cylindrical portion of the dummy hinge is inserted into the first cylindrical hole.

9. The hinge structure according to claim 3, wherein a flexible substrate for electrically connecting a circuit board housed in the first housing with a circuit board housed in the second housing is arranged in the dummy hinge.

10. A folding mobile terminal in which the hinge structure according to claim 3 is employed.

* * * * *